United States Patent [19]

Sparks et al.

[11] Patent Number: 5,010,783

[45] Date of Patent: Apr. 30, 1991

[54] TAPPET RETAINER ASSEMBLY

[75] Inventors: James D. Sparks, Edelstein; Dennis E. Van Meter, Peoria, both of Ill.

[73] Assignee: Caterpillar Inc., Peoria, Ill.

[21] Appl. No.: 547,008

[22] Filed: Jul. 2, 1990

[51] Int. Cl.$^5$ .............................................. G05G 5/06
[52] U.S. Cl. .................... 74/527; 267/166.1; 251/337
[58] Field of Search ................ 251/337, 297; 123/495, 123/496, 446, 508, 509, 90.49; 74/527; 403/108; 267/166.1

[56] References Cited

U.S. PATENT DOCUMENTS

| | | | |
|---|---|---|---|
| 3,027,844 | 4/1962 | Kruk-Strzelecki | 103/41 |
| 3,276,760 | 10/1966 | Last et al. | 267/1 |
| 3,759,637 | 9/1973 | Vuaille | 417/499 |
| 4,260,132 | 4/1981 | Habiger | 251/297 |
| 4,267,977 | 5/1981 | Stockner et al. | 239/132.3 |
| 4,452,574 | 6/1984 | Leblanc et al. | 417/490 |
| 4,526,519 | 7/1985 | Mowbray et al. | 417/490 |
| 4,527,738 | 7/1985 | Martin | 239/90 |
| 4,648,556 | 3/1987 | Leblanc et al. | 239/88 |
| 4,741,478 | 5/1988 | Teerman et al. | 239/88 |

OTHER PUBLICATIONS

"3176 Diesel Truck Engine-Systems Operation Testing and Adjusting", Form No. SENR3909-01, Published: Jul. 1988, by Caterpillar Inc., excerpts: pp. 22-23.

Primary Examiner—Martin P. Schwadron
Assistant Examiner—Kevin L. Lee
Attorney, Agent, or Firm—Anthony N. Woloch

[57] ABSTRACT

Conventional tappet retainer assemblies for a fuel injection pump typically include a blind radial passage formed in a tappet. Only one opening in the passage is available for inserting and removing a ball bearing or spring and stop pin which must be held in place before the tappet is inserted in a housing bore. In such an arrangement, the ball bearing or compressed spring and stop pin are prone to pop or fall out before the passage opening is closed by an internal wall of the housing bore. The present invention provides an improved tappet retainer assembly which includes a housing, a tappet, a stop device, and a biasing device. The tappet includes an internal passage which allows the stop device and biasing device to be communicated to their final assembled position in the internal passage while the tappet is already inserted in a bore of the housing.

15 Claims, 4 Drawing Sheets

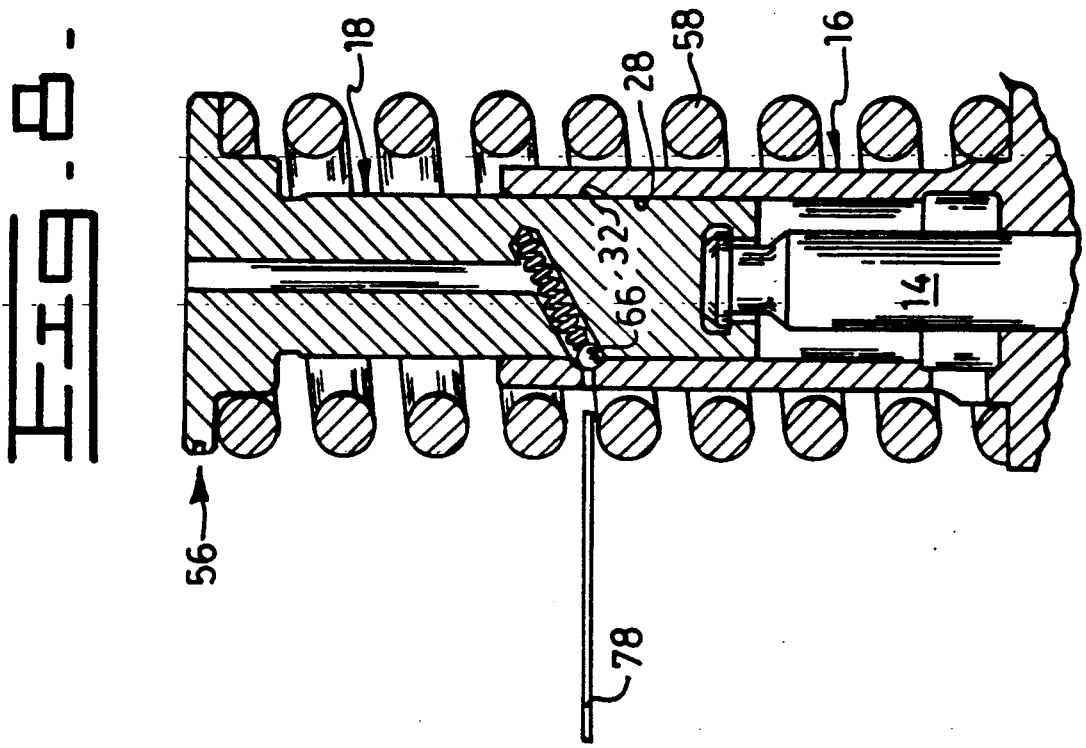
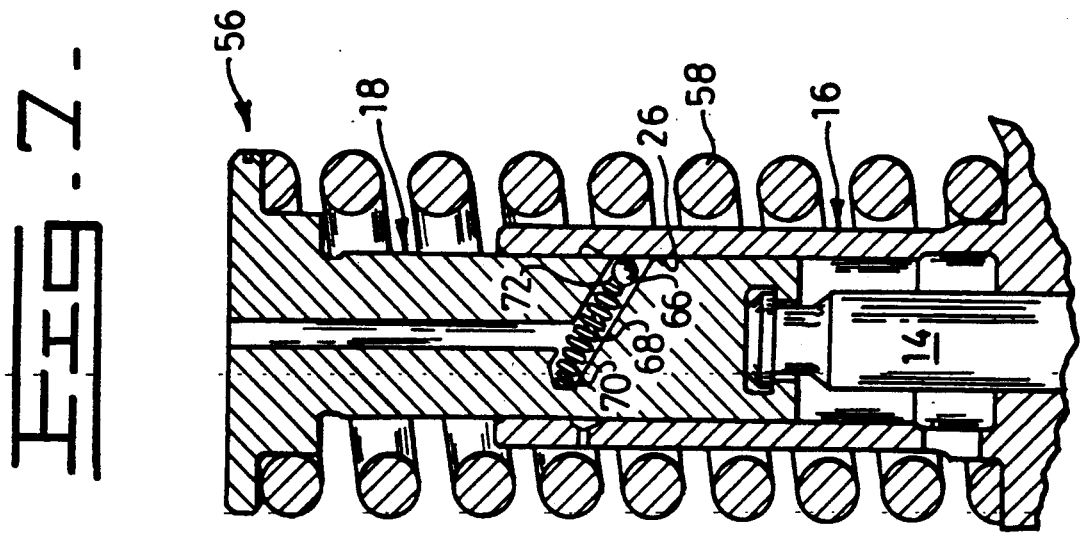

TAPPET RETAINER ASSEMBLY

DESCRIPTION

1. Technical Field

The present invention relates generally to a releasable locking mechanism and, more particularly, to a tappet retainer assembly which, for example, may be applied to a fuel injection pump.

2. Background Art

Mechanically-driven fuel injection pumps typically have a releasable locking mechanism which prevents a tappet and pumping plunger from becoming separated from the rest of the injection pump. The locking mechanism limits the displacement of the tappet and pumping plunger out of a housing bore of the injection pump when the injection pump stands alone (i.e., the tappet is not connected to a driving element, such as a mechanical cam or rocker arm).

One type of locking mechanism is shown in U.S. Pat. No. 4,741,478 issued to Teerman et al. on May 3, 1988, U.S. Pat. No. 4,267,977 issued to Stockner et al. on May 19, 1981, and U.S. Pat. No. 3,276,760 issued to Last et al. on Oct. 4, 1966. In these patents, the locking mechanism includes a stop pin slidably positioned in a radial passage of the tappet. A helical compression spring is also positioned in the tappet passage, radially inwardly of the stop pin, and biases the stop pin in a radially outwardly direction so that the stop pin can engage an annular recess provided in a housing of the injection pump.

One problem with this arrangement is that the radial passage merely has a single opening for installation and removal of the stop pin and stop pin spring. Thus, when assembling such components, the stop pin and stop pin spring are prone to pop out of the tappet passage before the tappet passage opening is covered as the tappet is inserted in a housing bore. Consequently, the stop pin and stop pin spring can become lost and thereby slow down the process of assembling the injection pump. Moreover, in order to take advantage of the effects of gravity during assembly, the elongated housing may have to be oriented in a vertical direction in order to install the tappet and pumping plunger and then placed in a horizontal direction in order to install the stop pin and stop pin spring in the radial blind passage of the tappet. Such reorientation of the housing adds time and cost to the assembly process.

Another type of locking mechanism is shown in U.S. Pat. No. 4,452,574 issued to Leblanc et al. on June 5, 1984 and U.S. Pat. No. 4,526,519 issued to Mowbray et al. on July 2, 1985. In these patents, the locking mechanism includes one or more ball bearings instead of a stop pin. A disadvantage of these particular locking mechanisms is that their manufacture and/or assembly is relatively complex.

The present invention is directed to overcoming one or more of the problems as set forth above.

DISCLOSURE OF THE INVENTION

In one aspect of the present invention an improved tappet retainer assembly is disclosed. The subject tappet retainer assembly includes a housing, a tappet, stop means, and a biasing means. The housing has an inner peripheral surface which defines a bore. The tappet has first and second end portions wherein the tappet first end portion is positioned outside of the housing bore and the tappet second end portion is reciprocally disposed in the housing bore. The tappet further includes an internal passage means extending from an outer peripheral surface of the tappet first end portion to an outer peripheral surface of the tappet second end portion. The stop means limits displacement of the tappet outwardly of the tappet bore. The stop means includes an annular recess formed in the housing inner peripheral surface and a stop positioned in the tappet internal passage means. The biasing means urges the stop against the housing inner peripheral surface and is positioned in the tappet internal passage means.

The present invention provides an inexpensive tappet retainer assembly which is easy to assemble and disassemble. The present tappet retainer assembly is useful, for example, on a fluid injector pump having a reciprocal pumping plunger. Such fluid injector pumps include, but not limited to, unit fuel pump-injectors.

BRIEF DESCRIPTION OF THE DRAWINGS

FIG. 7 is a diagrammatic view similar to FIG. 6 but showing another stage of assembly; and FIG. 8 is a diagrammatic view similar to FIG. 7 but showing another stage of assembly or disassembly.

BEST MODE FOR CARRYING OUT THE INVENTION

Figure 1:
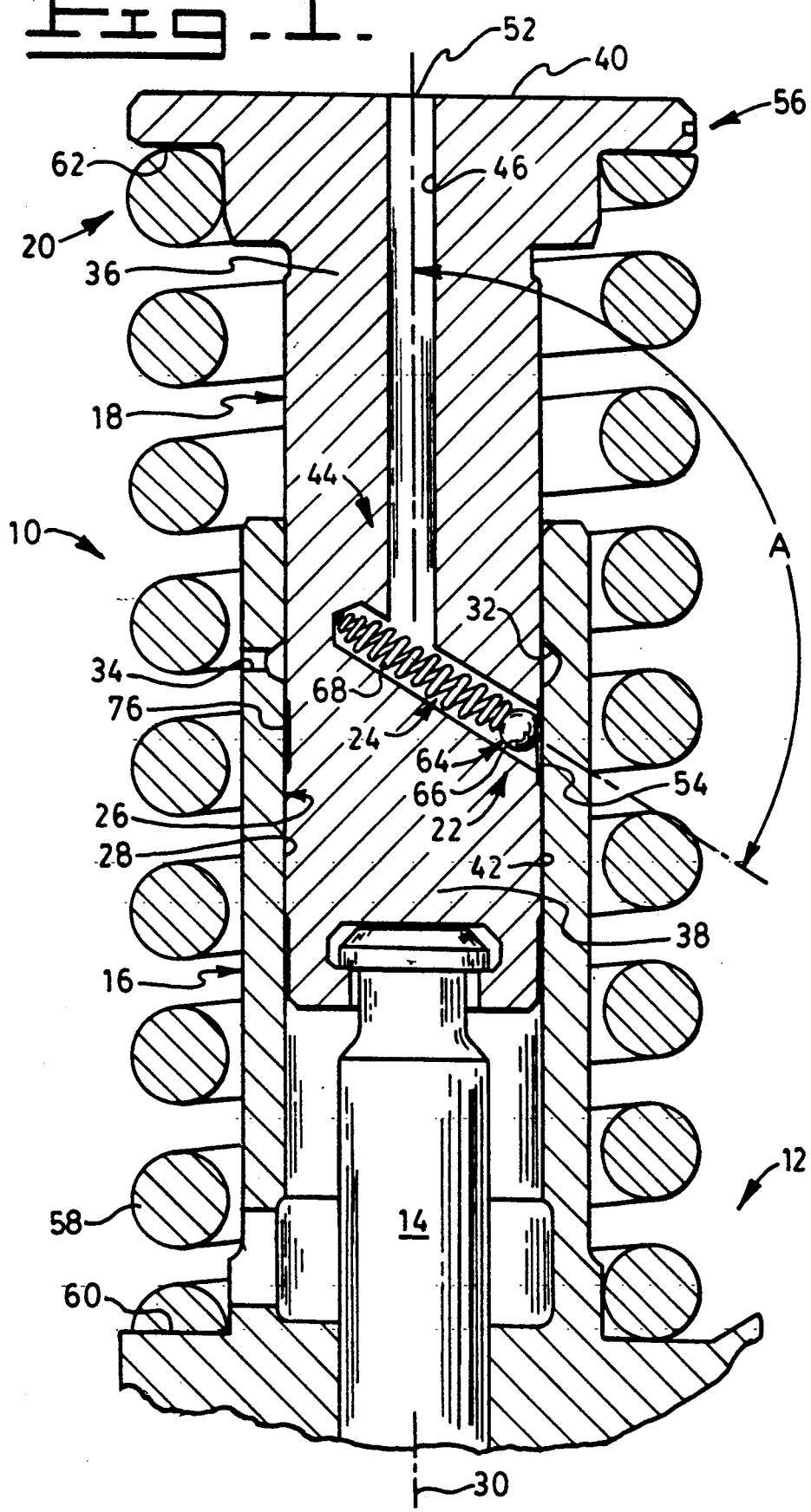
FIG. 1 is a diagrammatic partial cross-sectional view of one exemplary embodiment of the present invention.

Referring to FIGS. 1–8, there is shown an exemplary embodiment of the improved tappet retainer assembly 10 adapted for a fluid injection pump 12 having a reciprocal pumping plunger 14.

Referring to FIGS. 1–4, the tappet retainer assembly 10 includes a housing 16, a tappet or follower 18, first biasing means or device 20, stop means or device 22, and second biasing means or device 24.

Figure 2:
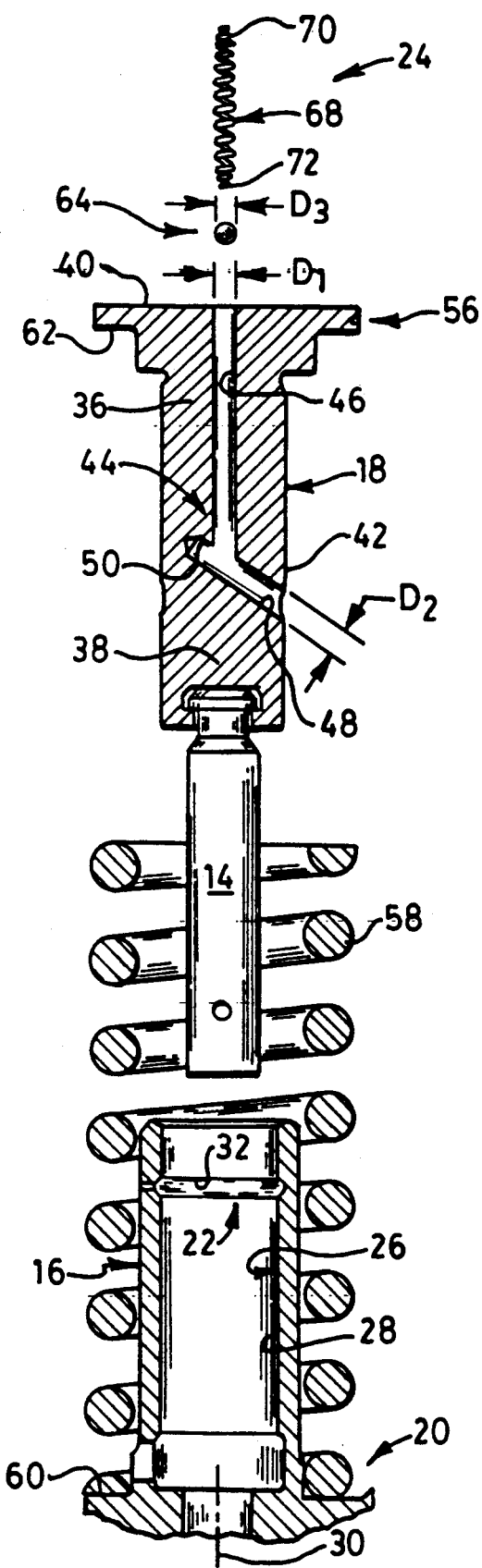
FIG. 2 is a diagrammatic reduced exploded view of the components shown in FIG. 1.
Figure 3:
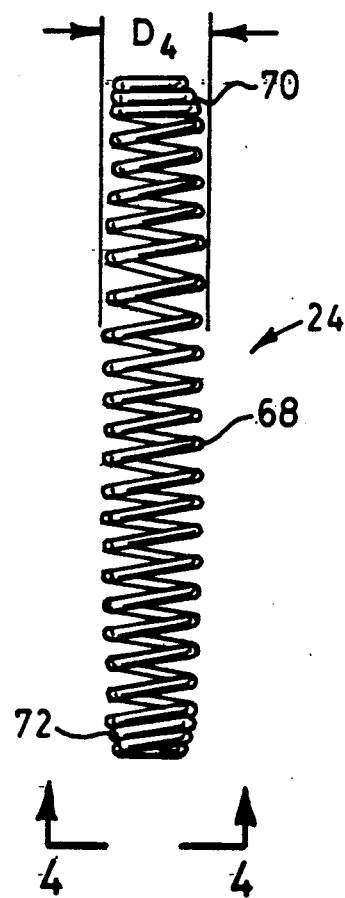
FIG. 3 is a diagrammatic enlarged view of the second biasing means shown in FIGS. 1 and 2.
Figure 4:
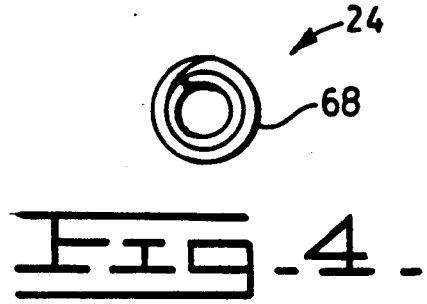
FIG. 4 is a diagrammatic end view taken along line 4—4 of FIG. 3.

Referring to FIGS. 1 and 2, the housing 16 has an inner peripheral surface 26 defining a bore 28. The housing bore 28 has a central longitudinal axis 30. The housing inner peripheral surface 26 also defines an annular recess 32 encircling the housing bore axis 30. The housing 16 further defines a relatively smaller aperture 34 which radially intersects the housing annular recess 32.

The tappet 18 has generally opposed first and second end portions 36,38. Each tappet end portion 36,38 has an outer peripheral surface 40,42 thereon. In an assembled state, the tappet first end portion 36 is positioned outside of the housing bore 28 and the tappet second end portion 38 is reciprocally positioned in the housing bore 28 so that its outer peripheral surface 42 is adjacent to and faces the housing inner peripheral surface 26. The tappet second end portion 38 is removably connected to the pumping plunger 14 by any known conventional means, such as shown in FIG. 1. Preferably, the outer peripheral surface 42 of the tappet second end portion 38 slidably contacts the housing inner peripheral surface 26 according to a lapped fit.

The tappet 18 further includes internal passage means or an internal passage 44 extending from the outer peripheral surface 40 of the tappet first end portion 36 to the outer peripheral surface 42 of the tappet second end portion 38. As shown in FIG. 2, the tappet internal passage means 44 includes first and second passages 46,48. The passages 46,48 are preferably generally straight and blind bores which intersect one another in the form of a generally "T" or "y" shaped intersection. The intersection of the passages 46,48 collectively define an internal shoulder 50. The tappet first passage 46 extends to the outer peripheral surface 40 of the tappet first end portion 36 where it defines an opening 52. The tappet second passage 48 extends to the outer peripheral surface 42 of the tappet second end portion 38 where it defines another opening 54.

Preferably, for ease of manufacture, the first and second passages 46,48 each have a cross-sectional diameter $D_1, D_2$ (FIG. 2) wherein the diameter $D_1$ of the first passage 46 is less than the diameter $D_2$ of the second passage 48. For example, the diameter $D_2$ of the second passage 48 may be about 3.95 millimeters/0.156 inches while the diameter $D_1$ of the first passage 46 may be about 3.30 millimeters/0.130 inches. Thus, the difference in diameters between the first and second passages 46,48 provide a generous tolerance (i.e., the second passage 48 presents a large target) for ensuring that the relatively smaller diameter first passage 46 completely intersects the second passage 48.

Referring to FIG. 1, the second passage 48 is oriented at a preselected included angle A relative to the housing bore axis 30 which preferably coincides with a central longitudinal axis of the tappet 18. Preferably, the first passage 46 extends generally in the same direction as the housing bore axis 30 and, more preferably, coincides with it. Preferably, the preselected angle A is an oblique angle (i.e., neither 0° nor 90° nor 180°) and, more preferably, an obtuse angle (for example, about 120°) when angularly measured between the openings 52,54 and along the longitudinal axes of the blind passages 46,48. Since the position of the second passage 48 is usually hidden by the housing 16 in the assembled state of the tappet retainer assembly 10, the tappet 18 is preferably provided with an indexing means 56 such as a small indentation, scribed line or protuberance. The indexing means 56 is formed on a visible surface of the tappet first end portion 36 and aligned with the opening 54 of the second passage 48 facing the housing inner peripheral surface 26.

The first biasing means 20 is provided for biasing displacement of the tappet 18 in a direction outwardly of the housing bore 28. The first biasing means 20 includes a first helical compression spring 58 which is positioned between oppositely facing shoulders 60,62 of the housing 16 and tappet 18. The first spring 58 may apply a predetermined load against the tappet 18 when the injection pump 12 is completely assembled but standing alone. Alternatively, the first spring 58 may apply substantially no load against the the tappet 18 when the injection pump 12 is completely assembled but standing alone.

The stop means 22 is provided for limiting displacement of the tappet 18 out of the housing bore 28. The stop means 22 includes the annular recess 32 defined in the housing inner peripheral surface 26 and also a complementary stop 64 positioned in the second passage 48 of the internal passage means 44. Preferably, the stop 64 is a single rigid ball bearing 66 having a cross-sectional diameter $D_3$ (for example, about 3.00 millimeters/0.118 inches) wherein the diameter $D_3$ of the ball bearing 66 is less than the diameter $D_1, D_2$ of the internal passage means 44.

The second biasing means 24 is provided for biasing the stop 64 against the housing inner peripheral surface 26. The second biasing means 24 is positioned in the second passage 48 of the internal passage means 44. The stop 64 and second biasing means 24 are confined against displacement from the second passage 48 to the first passage 46 since the internal shoulder 50 confines the second biasing means 24. However, the shoulder 50 is of a configuration which advantageously permits displacement of the stop 64 and second biasing means 24 from the first passage 46 to the second passage 48.

Preferably, the second biasing means 24 includes a second helical compression spring 68 having a diameter $D_4$ (for example, about 3.05 millimeters/0.120 inches) wherein the diameter $D_4$ of the second spring 68 is less than the diameter $D_1, D_2$ of the internal passage means 44. Moreover, referring to FIGS. 3 and 4, the second spring 68 preferably has a pair of generally opposed but substantially identical tapered end portions 70,72. The tapered end portions 70,72 may be formed by providing extra dead coils (i.e., adjacent coil touch one another) at each end of the second spring 68. The dead coils have gradually reduced diameters relative to the main or intermediate portion of the second spring 68 which contains the mutually spaced active coils.

INDUSTRIAL APPLICABILITY

Preferably, the method of assembling the tappet retainer assembly 10 is accomplished by orienting and installing those components in a generally vertical position in order to take advantage of the effects of gravity. It is noted that other components of the fluid injection pump 12 may be advantageously installed in the housing 16 while the housing 16 is in this vertical position. Moreover, although for purposes of clarity, the assembly steps are described below in a sequence, alternatively, some of the assembly steps may be effected simultaneously or in a different sequence without departing from the invention.

Figure 5:
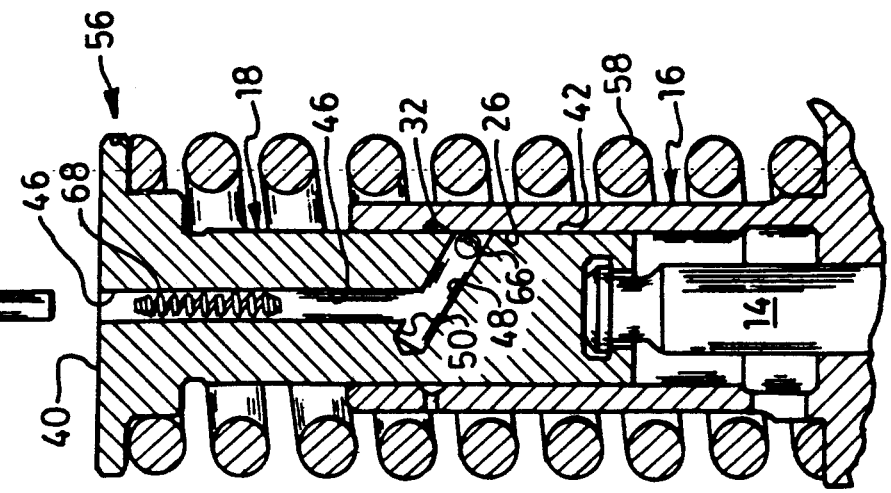
FIG. 5 is a diagrammatic view similar to FIG. 1 but reduced and showing one stage of assembly.

Referring to FIG. 2, an initial step is positioning the first spring 58 of the first biasing means 20 between the shoulders 60,62 of the housing 16 and the tappet 18. The tappet 18 is also removably connected to the pumping plunger 14. Referring to FIGS. 2 and 5, the next step is inserting the pumping plunger 14 and tappet second end portion 38 into the housing bore 2 against the bias of the first spring 58. The insertion of the tappet second end portion 38 is continued so that the first spring 58 is compressed (or, alternatively only so far that the first spring 58 remains uncompressed), the second passage 48 and opening 54 are positioned deeper in the housing bore 28 beyond the housing annular recess 32, and the tappet outer peripheral surface 42 slidably contacts the housing inner peripheral surface 26. Referring to FIGS. 2 and 5, the next step is inserting the ball bearing 66 of the stop means 22 into the tappet first passage 46 via the opening 52 at the outer peripheral surface 40. Gravity forces the ball bearing 66 to immediately fall and/or roll through the first passage 46 and into the second passage 48 so that the ball bearing 66 abuts against the housing inner peripheral surface 26 as shown in FIG. 5.

Figure 6:
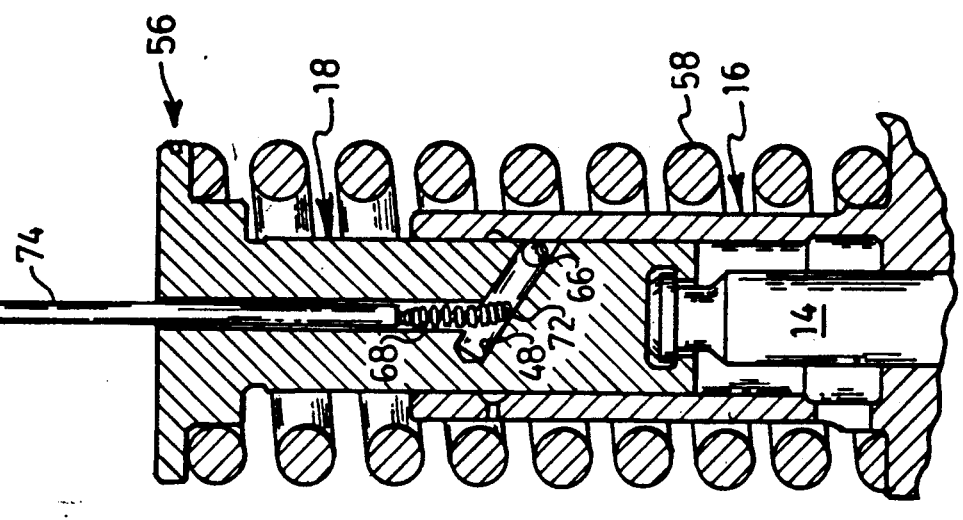
FIG. 6 is a diagrammatic view similar to FIG. 5 but showing another stage of assembly.

Referring to FIGS. 2 and 5, the next step is inserting the second spring 68 of the second biasing means 24 into the tappet first passage 46 via the opening 52 at the outer peripheral surface 40. A first tool 74, preferably in the form of a cylindrical rod, is used to push the second spring 68 through the first passage 46 and into the second passage 48. Referring to FIG. 6, as the leading tapered end portion 72 of the second spring 68 initially contacts the internal wall of the second passage 48, the first tool 74 begins to compress the active coils of the second spring 68. The tapered shape of the leading end portion 72 helps the second spring 68 to slidably turn downwardly into the second passage 48 without becoming stuck.

Referring to FIGS. 6 and 7, once the first tool 74 forces the compressed second spring 68 completely inside the second passage 48, the active coils of the second spring 68 immediately extend generally along the longitudinal axis of the second passage 48 until the leading end portion 72 abuts the ball bearing 66 and the trailing end portion 70 abuts an end wall of the second blind passage 48. The sum of the free length of the second spring 68 and diameter $D_3$ of the ball bearing 66 are chosen to be somewhat larger than the axial length of the second passage 48. Consequently, as shown in FIG. 7, the second spring 68 still remains compressed in order to positively urge the ball bearing 66 against the housing inner peripheral surface 26.

The first tool 74 is then removed from the first passage 46 and the downward force applied to the tappet 18, which had compressed the first spring 58, is released so that the first spring 58 urges the tappet 18 in a direction outwardly of the housing bore 28. The tappet 18 is displaced in that direction until the ball bearing 66 partially enters the housing annular recess 32. Referring to FIG. 8, the ball bearing 66 is larger than the depth of the housing annular recess 32 such that one side of the ball bearing 66 engages the housing annular recess 32 while the opposite side contacts the internal wall of the tappet second passage 48. The cross-sectional profile of the housing annular recess 32 is contoured such that the ball bearing 66 will positively lock on the housing annular recess 32 when the tappet 18 is urged outwardly of the housing bore 28. However, the ball bearing 66 is free to recede completely into the second passage 48 when the tappet 18 is pushed deeper into the housing bore 28. Consequently, the tappet 18 may be displaced deeper into the housing bore 28 but cannot be accidentally displaced outwardly of the housing bore 28 beyond the limit set by the stop means 22.

For example, the cross-sectional profile of the housing annular recess 32 may be formed by a form tool or cutter having cutting edges defined by two generally straight surfaces which are joined by a radius. According to the orientation shown in FIG. 1, the upper surface formed in the housing annular recess 32 preferably defines an included angle of about 30° relative to an imaginary horizontal plane positioned perpendicular to the longitudinal axis 30 of the housing bore 28. The lower surface formed in the housing annular recess 32 preferably defines an included angle of about 45° relative to an imaginary plane positioned perpendicular to the longitudinal axis 30 of the housing bore 28.

After completing the subassembly of the fluid injection pump 12, the fluid injection pump 12 may be installed in an engine. For example, the tappet 18 is urged deeper into the housing bore 28 against a predetermined preload of the first spring 58 so that the tappet retainer assembly 10 assumes a somewhat shorter assembled height as shown in FIGS. 7 and 1. Then the tappet 18 may be connected to any suitable drive means, such as the cam and rocker arm drive mechanism shown in U.S. Pat. No. 4,527,738.

Compared to prior locking mechanisms such as U.S. Pat. No. 4,741,478, the tappet retainer assembly 10 of the present invention advantageously facilitates assembly of the stop 64 and the second spring 68 into the internal passage means 44 in a reverse order. With the aid of gravity, the tappet internal passage means 44 readily communicates the ball bearing 66 in only one direction, from the opening 52 of the first passage 46 at the outer peripheral surface 40 to a location adjacent the opening 54 of second passage 48. Since the tappet second end portion 38 and second passage 48 are already positioned in the housing bore 28, the opening 54 of the second passage 48 is blocked which therefore prevents the ball bearing 66 from falling out. The tappet internal passage means 44 also readily communicates the second spring 68 in only one direction, from the opening 52 of the first passage 46 at the outer peripheral surface 40 to the second passage 48. The internal shoulder 50 serves as a one-way gate that helps lock the ball bearing 66 and second spring 68 in place once they completely enter the second passage 48. The tappet internal passage means 44 is also advantageous because it may also be used during operation for communicating a source of pressurized lubricant from the opening 52 of the first passage 46 at the outer peripheral surface 40 to the sliding bearing surfaces 42,26. Preferably, in order to more evenly distribute the lubricant, the opening 54 intersects an annular peripheral groove 76 (FIG. 1) formed in the outer peripheral surface 42 of the tappet second end portion 38.

Referring to FIG. 8, a method of disassembling the tappet retainer assembly 10 will now be described. If necessary, the tappet 18 is rotated so that the indexing means 56 is aligned with the housing aperture 34. This rotation automatically aligns the tappet second passage 48 (hidden by the housing 16) with the housing aperture 34 so that the housing aperture 34, annular recess 32 and second passage 48 communicate with one another. If the second spring 68 exerts a preload on the tappet 18 when the injection pump 12 is standing alone, the tappet 18 is preferably slightly depressed into the housing bore 28 in order to reduce the load on the ball bearing 66 while it is engaged with the housing annular recess 32.

A leading end portion of a second tool 78, preferably in the form of a cylindrical rod, is inserted in the housing aperture 34. The second tool 78 is used to push the ball bearing 66 completely out of the annular recess 32 and completely into the second passage 48. The compressed first spring 58 is then allowed to push the tappet 18 outwardly out of the housing bore 28 so that the ball bearing 66 glides over the leading end of the second tool 78 and housing annular recess 32. The second tool 78 is then removed from the housing aperture 34 and the tappet 18 and pumping plunger 14 are completely removed from the housing bore 28. When the second passage 48 is clear of the housing bore 28, the ball bearing 66 and second spring 68 can exit the second passage 48 via the opening 54 at the outer peripheral surface 42.

Other aspects, objects, and advantages of this invention can be obtained from a study of the drawings, the disclosure, and the appended claims.

We claim:
1. A tappet retainer assembly comprising:
a housing having an inner peripheral surface defining a bore;

a tappet having first and second end portions, each tappet end portion having an outer peripheral surface thereon, said tappet first end portion positioned outside of the housing bore, said tappet second end portion reciprocally positioned in the housing bore so that its outer peripheral surface is adjacent to and faces the housing inner peripheral surface, said tappet further including internal passage means extending from the outer peripheral surface of the tappet first end portion to the outer peripheral surface of the tappet second end portion;

first means for biasing displacement of the tappet in a direction outwardly of the housing bore;

stop means for limiting displacement of the tappet out of the housing bore, said stop means including an annular recess defined in the housing inner peripheral surface and a stop positioned in the tappet internal passage means; and second means for biasing the stop against the housing inner peripheral surface, said second biasing means positioned in the tappet internal passage means.

2. The tappet retainer assembly of claim 1 wherein said housing further defines an aperture intersecting the housing annular recess.

3. The tappet retainer assembly of claim 1 wherein said tappet internal passage means includes first and second passages intersecting one another, said first passage extending to the outer peripheral surface of the tappet first end portion, said second passage extending to the outer peripheral surface of the tappet second end portion, said stop positioned in the second passage.

4. The tappet retainer assembly of claim 3 wherein said first and second passages each have a cross-sectional diameter, said diameter of the first passage being less than the diameter of the second passage.

5. The tappet retainer assembly of claim 3 wherein said housing bore includes a longitudinal axis, said second passage oriented at a preselected oblique angle relative to the housing bore axis.

6. The tappet retainer assembly of claim 5 wherein said angle is an obtuse angle.

7. The tappet retainer assembly of claim 5 wherein said first passage extends generally in the same direction as the housing bore axis.

8. The tappet retainer assembly of claim 1 wherein said stop includes a ball bearing, said tappet internal passage means and ball bearing each having a diameter wherein the diameter of the ball bearing is less than the diameter of the tappet internal passage means.

9. The tappet retainer assembly of claim 1 wherein said first biasing means includes a helical compression spring.

10. The tappet retainer assembly of claim 3 wherein said second biasing means includes a helical compression spring, said intersecting first and second passages forming a generally T-shaped intersection defining an internal shoulder, said internal shoulder confining the spring against displacement from the second passage to the first passage.

11. The tappet retainer assembly of claim 10 wherein said tappet internal passage means and spring each have a diameter wherein the diameter of the spring is less than the diameter of the tappet internal passage means.

12. The tappet retainer assembly of claim 10 wherein said spring has a tapered end portion.

13. The tappet retainer assembly of claim 10 wherein said spring has generally opposed tapered end portions.

14. A tappet retainer assembly comprising:

a housing having an inner peripheral surface defining a bore;

a tappet having generally opposed first and second end portions, each tappet end portion having an outer peripheral surface thereon, said tappet first end portion positioned outside of the housing bore, said tappet second end portion reciprocally disposed in the housing bore so that its outer peripheral surface is adjacent to and faces the housing inner peripheral surface, said tappet further including first and second blind passages intersecting one another at a preselected angle greater than 0° and less than 180°, said first passage extending to the outer peripheral surface of the tappet first end portion, said second passage extending through the outer peripheral surface of the tappet second end portion;

first means for biasing displacement of the tappet in a direction outwardly of the housing bore;

stop means for limiting displacement of the tappet out of the housing bore, said stop means including an annular recess defined in the housing inner peripheral surface and a stop positioned in the tappet second passage; and second means for biasing the stop against the housing inner peripheral surface, said second biasing means positioned in the tappet second passage.

15. A tappet retainer assembly comprising:

a housing having an inner peripheral surface defining a bore, said housing bore having a central longitudinal axis, said housing inner peripheral surface defining an annular recess encircling the housing bore axis;

a tappet having generally opposed first and second end portions, each tappet end portion having an outer peripheral surface thereon, said tappet first end portion positioned outside of the housing bore, said tappet second end portion reciprocally disposed in the housing bore so that its outer peripheral surface slidably contacts the housing inner peripheral surface, said tappet further including first and second blind passages intersecting one another in the form of a generally T-shaped intersection, said first passage extending generally in the same direction as the housing bore axis and to the outer peripheral surface of the tappet first end portion, said second passage oriented at a preselected obtuse angle relative to the housing bore axis and extending to the outer peripheral surface of the tappet second end portion, said intersecting first and second passages collectively defining an internal shoulder;

a first helical compression spring biasing displacement of the tappet in a direction outwardly of the housing bore;

a ball bearing positioned in the the tappet second passage; and a second helical compression spring positioned in the tappet second passage and biasing the ball bearing against the housing inner peripheral surface, said internal shoulder having a configuration sufficient to permit displacement of the second spring from the first passage to the second passage and to prevent displacement of the second spring from the second passage to the first passage.

* * * * *